US010419513B2

United States Patent
Kim et al.

(10) Patent No.: US 10,419,513 B2
(45) Date of Patent: Sep. 17, 2019

(54) METHODS AND APPARATUS FOR REDUCING LATENCY SHIFT IN SWITCHING BETWEEN DISTINCT CONTENT STREAMS

(71) Applicant: Kiswe Mobile Inc., Bethesda, MD (US)

(72) Inventors: Jeong H. Kim, Potomac, MD (US); Francis X. Zane, New Providence, NJ (US); Thomas J. Janiszewski, Andover, NJ (US); Wim Sweldens, New Providence, NJ (US); Yung-Lung Ho, Bethesda, MD (US)

(73) Assignee: Kiswe Mobile Inc., Bethesda, MD (US)

( * ) Notice: Subject to any disclaimer, the term of this patent is extended or adjusted under 35 U.S.C. 154(b) by 61 days.

(21) Appl. No.: 15/866,011

(22) Filed: Jan. 9, 2018

(65) Prior Publication Data
US 2018/0131744 A1 May 10, 2018

Related U.S. Application Data

(62) Division of application No. 14/546,614, filed on Nov. 18, 2014, now Pat. No. 9,900,362.
(Continued)

(51) Int. Cl.
*H04L 29/06* (2006.01)
*H04N 21/2343* (2011.01)
(Continued)

(52) U.S. Cl.
CPC .......... *H04L 65/607* (2013.01); *H04L 65/605* (2013.01); *H04L 65/80* (2013.01);
(Continued)

(58) Field of Classification Search
CPC ..... H04L 65/60; H04L 65/601; H04L 65/602; H04L 65/605; H04L 65/607; H04L 65/80;
(Continued)

(56) References Cited

U.S. PATENT DOCUMENTS 7,472,198 B2 12/2008 Gupta et al.
7,603,689 B2 10/2009 Baldwin et al.
(Continued)

FOREIGN PATENT DOCUMENTS

EP 1675399 A2 6/2006
EP 1796394 A2 6/2007
(Continued)

OTHER PUBLICATIONS

Y.J. Liang et al., "Low-Latency Streaming of Pre-Encoded Video Using Channel-Adaptive Bitstream Assembly," IEEE International Conference on Multimedia and Expo (ICME), 2002, pp. 873-876, vol. 1.
(Continued)

*Primary Examiner* — Vivek Srivastava
*Assistant Examiner* — William C McBeth
(74) *Attorney, Agent, or Firm* — Ryan, Mason & Lewis, LLP

(57) ABSTRACT

A method comprises receiving content from a source, and generating multiple content streams each comprising the received content. Each content stream includes segments comprising respective portions of the received content. Different segmenting is utilized in generating respective ones of the content streams such that the segments in each of the content streams are offset in time relative to corresponding segments in the other ones of the streams. For example, generating the multiple content streams may comprise segmenting n content streams such that each content stream comprises segments of length Ts with corresponding segments in adjacent ones of the content streams being offset from one another by an offset Tg. Such an arrangement ensures that latency shift upon switching between one of the content streams and another content stream in a different set
(Continued)

of multiple content streams at a client device can be limited to a value approximated by Tg.

19 Claims, 6 Drawing Sheets

Related U.S. Application Data

(60) Provisional application No. 61/938,442, filed on Feb. 11, 2014.

(51) Int. Cl.
    *H04N 21/262*     (2011.01)
    *H04N 21/438*     (2011.01)
    *H04N 21/845*     (2011.01)

(52) U.S. Cl.
    CPC ... *H04N 21/23439* (2013.01); *H04N 21/2625* (2013.01); *H04N 21/4384* (2013.01); *H04N 21/845* (2013.01); *H04N 21/8456* (2013.01)

(58) Field of Classification Search
    CPC ......... H04N 21/23439; H04N 21/2625; H04N 21/26266; H04N 21/26275; H04N 21/4384; H04N 21/845; H04N 21/8456
    See application file for complete search history.

(56) References Cited

U.S. PATENT DOCUMENTS

| | | | |
|---|---|---|---|
| 8,321,905 | B1 | 11/2012 | Streeter et al. |
| 8,327,411 | B2 | 12/2012 | Kerofsky |
| 8,340,098 | B2 | 12/2012 | Wirick |
| 8,453,187 | B2 | 5/2013 | MacInnis |
| 8,495,688 | B2 | 7/2013 | Jagadeesan et al. |
| 2002/0146233 | A1 | 10/2002 | Barton et al. |
| 2004/0218606 | A1 | 11/2004 | Leatherbury et al. |
| 2006/0018379 | A1 | 1/2006 | Cooper |
| 2006/0143669 | A1* | 6/2006 | Cohen ................ H04N 21/4384 725/90 |
| 2007/0121629 | A1 | 5/2007 | Cuijpers et al. |
| 2008/0059724 | A1 | 3/2008 | Stifter, Jr. |
| 2010/0088159 | A1 | 4/2010 | Henshaw et al. |
| 2010/0146137 | A1 | 6/2010 | Wu et al. |
| 2011/0061084 | A1* | 3/2011 | Bejerano ................ H04H 20/82 725/109 |
| 2011/0161517 | A1 | 6/2011 | Ferguson |
| 2011/0238789 | A1 | 9/2011 | Luby et al. |
| 2012/0042050 | A1 | 2/2012 | Chen et al. |
| 2013/0064283 | A1 | 3/2013 | Sun et al. |
| 2013/0091251 | A1 | 4/2013 | Walker et al. |
| 2013/0159421 | A1 | 6/2013 | Yue et al. |
| 2013/0191489 | A1 | 7/2013 | Swaminathan et al. |
| 2013/0195203 | A1 | 8/2013 | Syed et al. |
| 2013/0219442 | A1* | 8/2013 | Hu ..................... H04N 21/8456 725/100 |
| 2013/0250975 | A1 | 9/2013 | Ahn et al. |
| 2013/0332977 | A1 | 12/2013 | Lindquist |
| 2014/0003516 | A1 | 1/2014 | Soroushian |
| 2014/0059243 | A1 | 2/2014 | Reisner |
| 2014/0101227 | A1 | 4/2014 | Bieselt et al. |
| 2014/0269932 | A1 | 9/2014 | Su et al. |
| 2015/0100702 | A1 | 4/2015 | Krishna et al. |
| 2015/0281752 | A1 | 10/2015 | Van Veldhuisen |
| 2015/0312304 | A1 | 10/2015 | Landais et al. |

FOREIGN PATENT DOCUMENTS

| | | |
|---|---|---|
| EP | 2232379 A1 | 9/2010 |
| EP | 2485501 A1 | 8/2012 |
| GB | 2483125 A | 2/2012 |
| WO | PCT/US2015/015417 | 5/2015 |

OTHER PUBLICATIONS

"Best Practices for Creating and Deploying HTTP Live Streaming Media for the iPhone and iPad," https://developer.apple.com/library/ios/technotes/tn2224/_index.html, Technical Note TN2224, Feb. 2014, 11 pages.

Bouzakria et al., "Overhead and Performance of Low Latency Live Streaming using MPEG-DASH," The 5th International Conference on Information, Intelligence, Systems and Applications, Jul. 7-9, 2014, pp. 92-97.

Hazma Er Tal., "A DASH-based Free Viewpoint Video Streaming System," Proceedings of Network and Operating System Support on Digital Audio and Video Workshop, Mar. 19-21, 2014, pp. 55-60.

* cited by examiner

METHODS AND APPARATUS FOR REDUCING LATENCY SHIFT IN SWITCHING BETWEEN DISTINCT CONTENT STREAMS

PRIORITY CLAIM

The present application is a division of U.S. patent application Ser. No. 14/546,614 filed Nov. 18, 2014, and entitled "Methods and Apparatus for Reducing Latency Shift in Switching Between Distinct Content Streams," now issued as U.S. Pat. No. 9,900,362, which is incorporated by reference herein in its entirety and claims priority to U.S. Provisional Patent Application Ser. No. 61/938,442, filed Feb. 11, 2014, and entitled "Methods and Apparatus for Reducing Latency Shift in Switching Between Distinct Content Streams," which is also incorporated by reference herein in its entirety.

FIELD

The field relates generally to delivery of live video and other types of media content, and more particularly to delivery of content streams over networks.

BACKGROUND

The rapidly growing use of mobile devices such as laptops, tablets and cellphones has greatly diversified the modes of media consumption. For live online video, the interactive and connected nature of these devices naturally encourages customizations of the viewing experience to include mixed media, social interaction, and various types of content modification or selection. One potential option is to enable individuals to choose their own camera angle during a live event broadcast. While this is technically feasible, the potentially large latency jump a viewer may experience switching from one live stream to another presents an annoyance. Here, latency may be characterized as the delay from the time a video frame is broadcast to the time it is presented on a mobile device. While streamed video latency can be long, often 30 seconds or more, it's nearly unnoticeable if maintained steadily throughout the broadcast. However, when using a live streaming protocol, such as Apple's HTTP Live Streaming (HLS), a switch to an alternate view on a mobile device may result in upwards of 10 seconds random shift in latency, a potentially frustrating experience.

SUMMARY

Illustrative embodiments of the invention significantly reduce stream switching latency shift in the delivery of live video and other types of media content.

In one embodiment, a method comprises receiving content from a source, and generating multiple content streams each comprising the received content. Each content stream includes segments comprising respective portions of the received content. Different segmenting is utilized in generating respective ones of the content streams such that the segments in each of the content streams are offset in time relative to corresponding segments in the other ones of the streams. For example, generating the multiple content streams may comprise segmenting the content streams such that each content stream comprises segments of length Ts with corresponding segments in adjacent ones of the content streams being offset from one another by an offset Tg. Such an arrangement ensures that latency shift upon switching between one of the content streams and another content stream in a different set of multiple content streams at a client device can be limited to a value approximated by Tg.

In another embodiment, a method comprises receiving a selected content stream of a first set of multiple content streams each comprising content from a first source. In conjunction with switching from the selected content stream to a content stream of a second set of multiple content streams each comprising content from a second source, an offset index of the selected content stream relative to other content streams in the first set is utilized to identify a particular one of the content streams of the second set in a manner that limits a latency shift between the selected content stream of the first set and the particular content stream of the second set, and delivery of the particular content stream of the second set is requested. For example, each of the first and second sets of content streams illustratively comprises a plurality of content streams segmented such that each content stream comprises segments of length Ts with corresponding segments in adjacent ones of the content streams being offset from one another by an offset Tg, such that the latency shift between the selected content stream of the first set and the particular content stream of the second set is less than or equal to Tg.

In some embodiments, the multiple content streams comprise n content streams each comprising a single keyframe.

In other embodiments, the multiple content streams comprise n/k content streams each comprising k keyframes.

Numerous alternative arrangements of content streams and corresponding staggered stream segments can be used.

DETAILED DESCRIPTION

Figure 1:
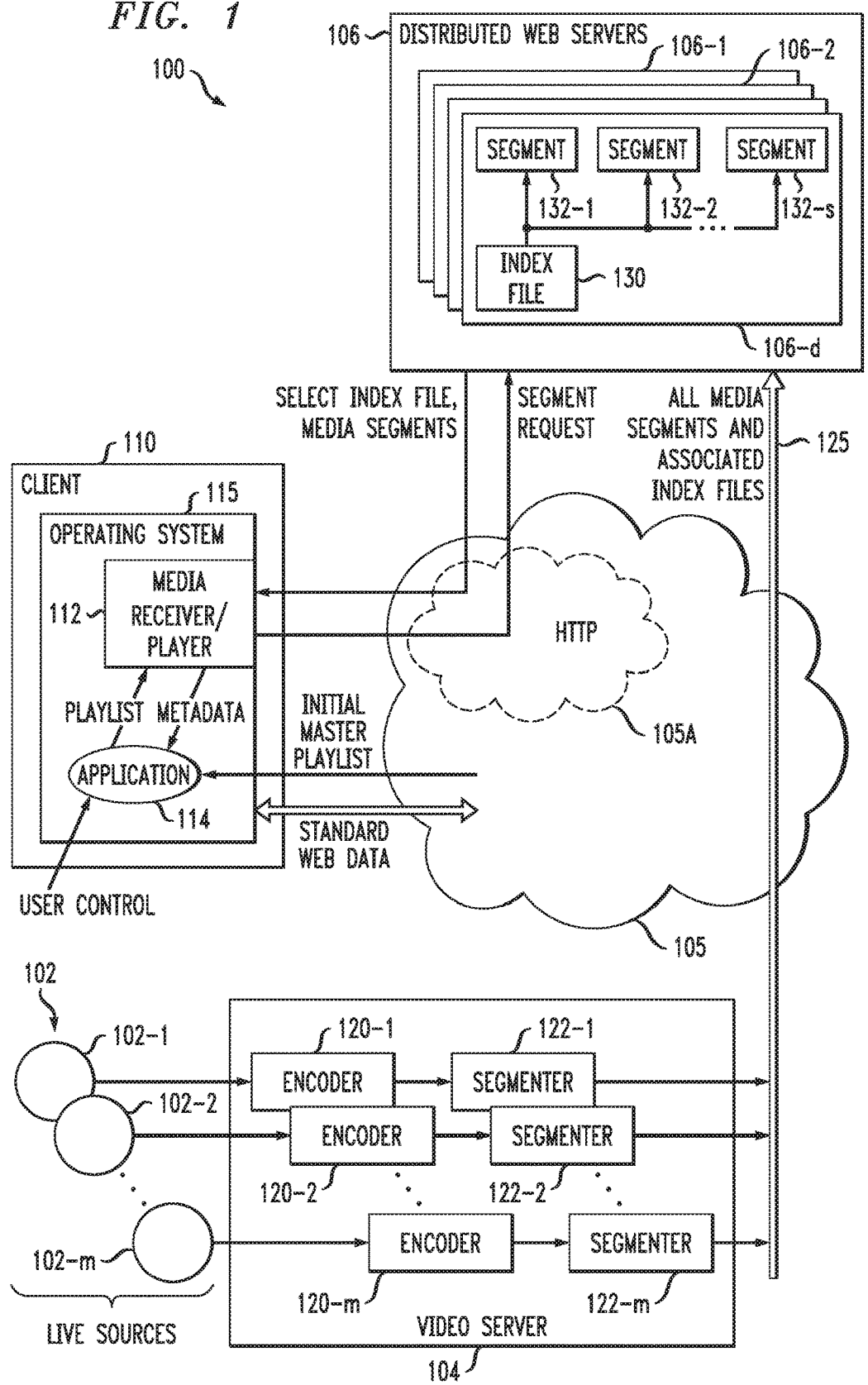
FIG. 1 shows a content delivery system configured for delivery of live video with reduced stream switching latency shift in an illustrative embodiment.

Embodiments of the invention will be illustrated herein in conjunction with exemplary content delivery systems that include particular arrangements of clients, servers, sources and networks. It should be understood, however, that embodiments of the invention are more generally applicable to any content delivery system or associated device or technique that involves functionality for selection among staggered segments from multiple content streams generated from a given content source. The term "content stream" as used herein is intended to be broadly construed so as to encompass, for example, live video or other types of multimedia streams as well as other types of content streams that are deliverable over one or more networks in a content delivery system.

Embodiments of the invention include but are not limited to methods, apparatus, systems, processing devices, integrated circuits, and computer-readable storage media having computer program code embodied therein.

Some embodiments of the invention are configured to utilize streaming techniques that are based at least in part on the above-noted Apple HLS protocol. However, it is to be appreciated that other embodiments can be configured utilizing a wide variety of other types of streaming protocols and accordingly are not limited to use with live streaming or HTTP.

As described previously, stream switching latency shift is a significant problem in conventional streaming protocols such as Apple HLS. The stream switching latency shift in systems utilizing such protocols can in some cases be minimized with simple optimization of the streaming parameters if available bandwidth significantly exceeds the streaming bit rate. However, a viable broadcast solution should accommodate devices that, by their mobile nature, are connected via relatively slow cellular networks or are in a congested WiFi zone. Moreover, with today's high-resolution displays, even on a cellphone, many users prefer to stream at a higher bit rate to maximize video quality, exacerbating the problem.

Given the constraint of limited bandwidth at the network's edge, a viable solution to time synchronize stream contents during switching in some embodiments herein will illustratively address three distinct technical challenges.

The first challenge relates to the current MPEG video compression standard. Specifically, a media player in a client device can start decoding a compressed video stream only from discrete I-frame locations, which are typically spaced many frames apart. Using as an example Apple's recommendation Technical Note (TN) 2224, "Best Practices for Creating and Deploying HTTP Live Streaming Media for the iPhone and iPad," keyframes comprising respective instantaneous decoder refresh (IDR) frames, which are a type of intra-coded frame (I-frame), should be located 3 seconds apart for cellular and WiFi connections. In other words, when the player is ready to switch streams, the new stream may need to be time shifted by up to 3 seconds, assuming sufficient content buffering, in order to align the keyframe. As keyframes contain more information and thus use more bandwidth than other types of frames, increasing the density of keyframes in a stream is an unattractive option.

The second challenge relates to the use of HTTP, the underlying protocol used by the World Wide Web for message delivery. On the web, a typical transaction involves a user, via an Internet address or URL, commanding a web server to transmit the requested blocks of information, e.g., a web page. To utilize such existing infrastructure, a compressed video stream is separated into segments and then distributed as discrete files to multiple widely-dispersed HTTP web servers, which caches the segments. If multiple live streams are available per session, e.g., from multiple cameras, all the segments from all streams are cached at each server site. Clients, large numbers of which may request files from each server, are responsible for requesting copies of the media segments as needed. The server does not keep track of which client might request a file at which time. Current HTTP streaming protocols are, in effect, hybrid push-pull systems where files are pushed out to servers at the edge of the Internet and stored there as the servers await requests from the clients.

To notify the clients of the availability of a segment, a video server continuously updates an index file for each content stream. The index file, listing the URL of the most recently distributed segment file, is also cached at the web servers. Independently, each individual client repeatedly downloads the index file, at a pace suitable for uninterrupted play for its connection, to locate the next needed segment.

It should be noted that most off-the-shelf mobile devices have hardware-assisted media players built in to their operating systems. Other than directing the player to new contents, an application has limited ability to alter its internal streaming algorithm. At session initiation, corresponding to when a viewer starts watching a broadcast, a client usually obtains an initial master playlist listing the URLs of the various needed index files for all available session associated content from a provider on the Internet. The determination of streaming parameters such as segment size and video resolution is made by the content provider. These parameters can be passed to the player via the playlists as well as in the index files.

The player typically starts decoding a segment only if the segment is fully downloaded. The HTTP architecture, in effect, has introduced another layer of granularity, especially for long segments. Again, using Apple's recommended HLS setting as a guide, the content playtime of a segment, denoted herein as Ts, can be up to 10 seconds.

In addition, the HTTP streaming architecture is both stateless and built on the best effort content delivery structure of the Internet. Thus, practical implementations using HTTP cannot depend on synchronizing any server's action to a client's current status and vice versa. Moreover, given the large overhead required to process requests in HTTP and the uncertainty in content delivery time, methods that depend on fast stream switching or real-time synchronization of data streams fail to overcome the stream switching latency shift problem.

The third challenge relates to additional constraints associated with vendor-specific implementations. For example, streaming protocols such as Apple HLS, Microsoft HSS, and Adobe HDS all place their own significant constraints on the player configuration. For example, most players are built into the operating systems of the mobile devices or associated web browsers and their built-in algorithms cannot be modified by a custom application. Accordingly, it is desirable in some embodiments to maintain compliance with existing streaming protocols such as Apple HLS.

Conventional Apple HLS players, in live stream mode, typically play the next to last entry in the index file, and to start decoding a given segment, need to have downloaded the entire segment. This approach ensures that the next segment to be played is already available at the web server. Coupled with a sufficiently long segment playing time, the client can minimize interruption during play. However, this approach has significant ramifications in terms of latency, which are estimated as follows:

(1) New stream startup time, Td, is approximately=one segment download time from the HTTP web server+segment processing overhead. Td can be estimated by each client, for example, as a running average of measured startup delays.

(2) Average latency, $Ta=2.5Ts+Td+$segment distribution time from video server to HTTP web server, where Ts denotes content playtime of a segment.

(3) Broadcast latency, Tl, denotes the delay from the time a video frame is broadcast to the time it is presented on the client device. Tl can range from about $Ta-0.5Ts$ to $Ta+0.5Ts$, which represents to a significant potential latency shift upon switching from one content stream to another content stream. More particularly, one can expect the maximum possible shift in latency when switching streams to be one Ts, i.e., up to 10 seconds based on Apple's segment size recommendation.

As will be described in more detail below, illustrative embodiments of the present invention significantly reduce this stream switching latency shift.

In some embodiments, video access points are increased without adding information overhead at the edge of the network where bandwidth is limited. Such embodiments generally do not attempt to reduce latency or to decrease stream startup delay, but instead aim to control the variation or shift in latency that occurs during a stream switch. These embodiments are implemented in some cases using a stateless HTTP protocol with a hybrid push-pull architecture not designed for real-time data flow control.

FIG. 1 shows a content delivery system 100 configured for delivery of live video with reduced stream switching latency shift in an illustrative embodiment. In this embodiment, the system 100 comprises multiple live sources 102 and a video server 104 that encodes and segments media streams from the live sources 102 and generates associated index files. The live sources 102 are more particularly denoted in the figure as respective live sources 102-1, 102-2, ... 102-m, and illustratively comprise respective live video sources, such as broadcast video sources. The video server 104 is coupled to a network 105 at least a portion 105A of which supports HTTP communications.

Also coupled to the network 105 are distributed web servers 106, illustratively including d distributed web servers denoted 106-1, 106-2, ... 106-d. The distributed web servers 106 cache the media segments and associated index files received from the video server 104 over the network 105.

One or more of the web servers 106 communicate over network 105 with a client 110. The client 110 comprises a built-in media receiver/player 112 and a viewer application 114. The media receiver/player 112 and viewer application 114 are illustratively implemented at least in part within or otherwise in association with an operating system 115 of the client 110. The viewer application 114 directs the built-in media receiver/player 112 via a playlist illustratively containing index file URLs. The built-in media receiver/player 112 is an example of what is more generally referred to herein as a "media player," a "client player" or simply a "player." It is to be appreciated that a wide variety of different players can be used, and such players need not be implemented using a built-in media receiver/player arrangement such as that illustratively shown in client 110 of system 100. Thus, a "player" as that term is broadly used herein should not be construed as being limited, for example, to a hardware-assisted media player that is built in to the operating system of a client device.

The video server 104 in the present embodiment comprises a plurality of encoders 120-1, 120-2, ... 120-m each of which is coupled to a corresponding one of a plurality of stream segmenters 122-1, 122-2, ... 122-m. Media segments and associated index files are supplied by the video server 104 to at least a subset of the distributed web servers 106 over the network 105 via one or more connections 125.

Figure 2:
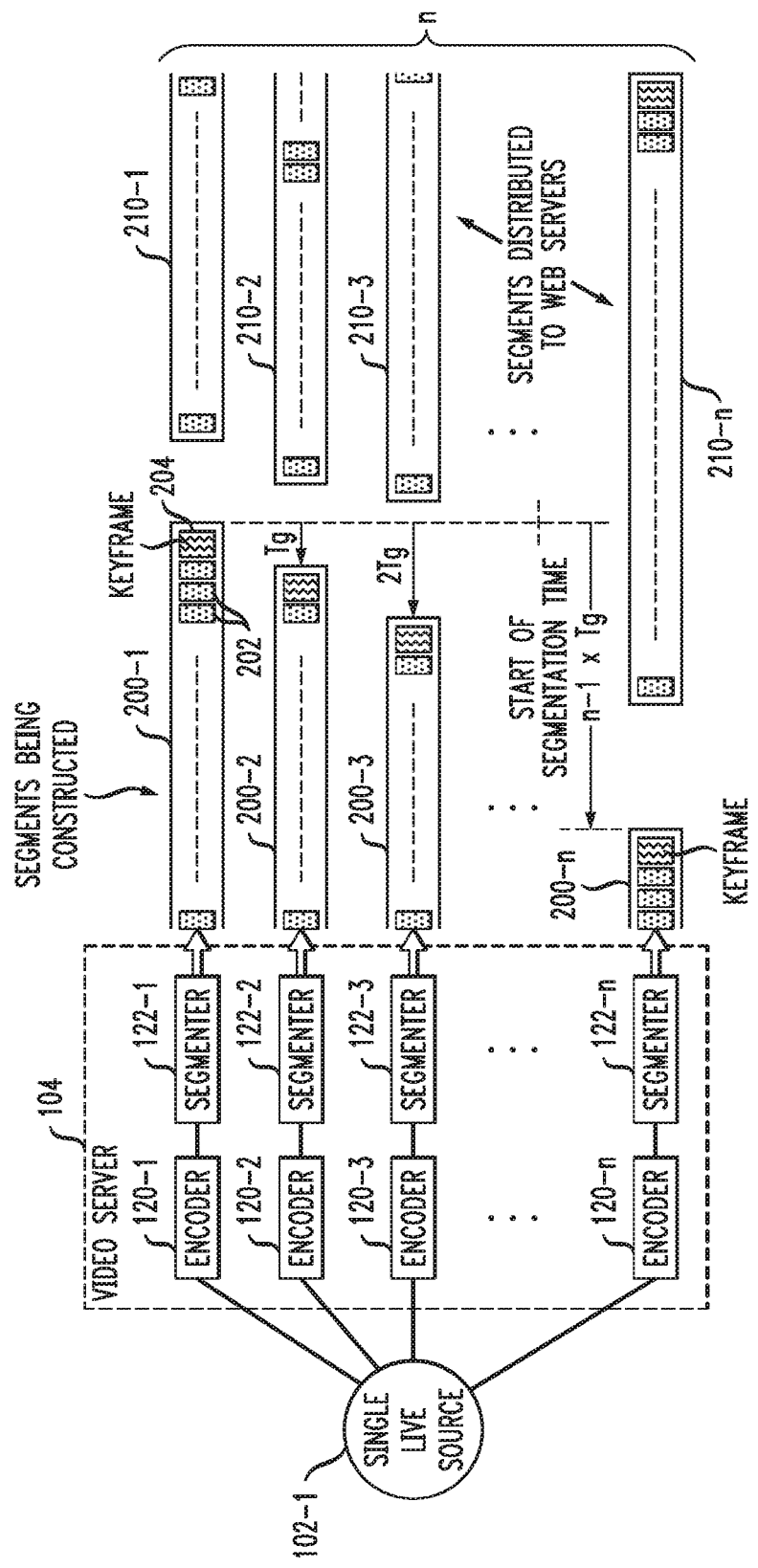
FIG. 2 illustrates exemplary staggered segments in multiple replicated live video streams generated in a video server of the content delivery system of FIG. 1.

It should be noted that, although the figure shows each of the m live sources 102 being coupled to a corresponding one of the m encoders 120, this is by way of example only, and in other operating configurations of the content delivery system 100, each of the m live sources 102 may be illustratively connectable to any of the m encoders 120. For example, the live sources 102 may be coupled to the encoders 120 via a network or a bus, such that any of the sources can communicate with any of the encoders. FIG. 2 illustrates an example of an arrangement in which a single one of the live sources 102 is coupled to each of n encoders, where n may but need not be equal to m.

Also, in other embodiments, a separate set of encoders 120 and segmenters 122 may be provided within video server 104 for each of the live sources 102. Additionally or alternatively, multiple video servers 104 can be implemented within the system 100, for example, with each such video server providing a set of encoders 120 and segmenters 122 for just one of the live sources 102. Thus, a given implementation of video server 104 comprising encoders 120 and segmenters 122 can illustratively be associated with only one of the live sources 102. The term "video server" as used herein is intended to be broadly construed, so as to encompass these and other arrangements of one or more sets of encoders and segmenters.

Moreover, although the encoders 120 and segmenters 122 are shown as separate elements in this embodiment, in other embodiments a single module can be used to implement both encoding and segmentation functionality. Such a module may comprise, for example, an integrated circuit or a portion of an integrated circuit.

Each of the web servers 106 stores multiple index files as well as sets of segments associated with respective ones of those index files. This is illustrated in a given instance as an index file 130 relating to a plurality of segments 132-1, 132-2, ... 132-s, although this simplified arrangement is presented by way of example only, and numerous other arrangements of index files and segments can be used.

In one possible operating configuration of the content delivery system 100, the video server 104 receives content from a particular one of the live sources 102, and utilizes the encoders 120 and segmenters 122 to generate multiple content streams each comprising the received content, with each content stream including segments comprising respective portions of the content. Such streams are also referred to in some contexts herein as "replicated" streams. Different segmenting is utilized in generating respective ones of the content streams such that the segments in each of the content streams are offset in time relative to corresponding segments in the other ones of the streams. As will become apparent from additional description below, such an embodiment advantageously allows stream switching latency shift to be significantly reduced relative to conventional arrangements.

In the FIG. 1 embodiment, it is assumed that the content used to generate multiple content streams comprises live video, although it should be understood that other types of content can be used in other embodiments.

The video server 104 in generating the multiple content streams encodes the content received from the particular one of the live sources 102 in each of at least a subset of the encoders 120, and segments the encoded received content in the corresponding segmenters 122 using staggered segmentation locations for respective ones of the content streams so as to offset the segments in each of the content streams from the corresponding segments in each of the other content streams. Each of the encoders 120 is configured to encode the received content utilizing substantially the same compression ratio.

Exemplary staggered segments of the type described above are shown in FIG. 2. In this example, a single live source 102-1 supplies the same content to each of n encoders 120-1 through 120-n of video server 104, where as noted above n may but need not be equal to m. Outputs of the encoders 120-1 through 120-n are coupled to inputs of respective segmenters 122-1 through 122-n of the video server 104. The outputs of the respective segmenters 122-1 through 122-*n* provide respective ones of n content streams that comprise respective segments 200-1 through 200-*n*. More particularly, in this example, generating the multiple content streams in video server 104 comprises segmenting n content streams such that each content stream comprises segments of length Ts with corresponding segments in adjacent ones of the content streams being offset from one another by an offset Tg. The first frame of each of the corresponding segments comprises a keyframe 204, as illustrated in the figure. Each of the segments includes additional frames 202 following the keyframe 204.

The content streams in this example include respective segments 200-1 through 200-*n* that are currently being constructed by the video server 104 as well as additional respective segments 210-1 through 210-*n* that were previously constructed by the video server 104 and are being distributed to the web servers 106.

The segment length Ts in this particular example is an integer multiple of Tg such that Ts/n=Tg and latency shift upon switching between one of the content streams and another content stream in a different set of multiple content streams at a client device can be controlled so as to be less than or equal to Tg.

Thus, as illustrated in the figure, the second segment 200-2 is staggered by an amount Tg relative to the first segment 200-1, the third segment 200-3 is staggered by an amount 2Tg relative to the first segment 200-1, and so on through the set of corresponding segments 200-1 through 200-*n*, until the final segment 200-*n* which is staggered by an amount (n−1)×Tg relative to the first segment 200-1.

The corresponding segments in respective ones of the content streams are indexed by relative offset index i where i ranges from 0 to n−1. This is an example of an arrangement in which values of i are limited to a range based on n. Other types of indexing arrangements may be used in other embodiments.

The segments of the content streams are distributed to multiple ones of at least a subset of the web servers 106 such that each of those web servers 106 receives all of the segments from each of the content streams and maintains a separate index file for each of the content streams.

It is to be appreciated that the particular segmenting arrangement illustrated in FIG. 2 is exemplary only, and alternative segmenting arrangements can be used in other embodiments. Another exemplary segmenting arrangement suitable for use in embodiments of the present invention will be described below in conjunction with FIG. 6.

For a given live broadcast, operation of the system 100 using the exemplary staggered segment arrangement of FIG. 2 is further described as including the following steps.

1. Replicate each unique content stream n times. If a program includes multiple distinct content streams, e.g., various camera angles, each stream is replicated n times substantially simultaneously.

2. Encode each of the n content streams at the same compression ratio, but stagger the segmentation locations at equal frame distances apart such that Ts/n=Tg as shown in FIG. 2. The particular values used for Tg, Ts and n in some embodiments are design parameters and accordingly can be selected depending upon the particular needs of a given implementation context. The encoder generating a given one of the n content streams inserts a keyframe at the start of each segment. The segmentations should take place at substantially the same time for all alternate content streams, e.g., those corresponding to different camera views. By way of example, the target value for Tg in some embodiments will likely range from about 1 to 2 seconds while the value for Ts is generally between about 5 to 10 seconds, and values of n will typically be from about 3 to 10, although it is to be appreciated that other values can be used in other embodiments. As noted above, the staggered streams are indexed by their relative offset, i, where i ranges from 0 to n−1, and is only meaningful in a relative sense. For example, it is apparent from the staggering arrangement of FIG. 2 that the first video frame of a segment with staggered offset 3 was encoded 2Tg after the first frame of a segment with offset 1. Whichever stream in a staggered set of n streams is labeled as the first stream is irrelevant. However, all camera view streams segmented at the same instance should have the same offset index. The only assumption here is that we can only seek segments within an n−1 offset of each other. Again, all n streams, when decoded, would play the exactly the same video. However, no two segments are identical as they represent different time slices of the video.

3. Distribute the segments such that each web server location has all staggered segments from all content streams. The associated playlist, one per staggered segment stream per web server, is likewise updated and distributed. Standard multicast technology can be used for mass distribution. Note that we have significantly increased the amount of data that is replicated, distributed and cached at the web servers. As bandwidth and storage have become plentiful between servers on the web, however, such increases in broadcast data can still be justified. Where bandwidth remains expensive, e.g., mobile connection to the servers, the FIG. 1 embodiment adds virtually no data overhead.

4. On the client side, while decoding each segment, the player 112 continuously passes synchronous metadata added by the video server to the viewer application 114. Timestamps of when each keyframe was first encoded are recorded by the viewer application 114 as they are identified. From the timestamps, the viewer application 114 can accurately calculate the elapsed time, Te, of the current frame from the beginning of the current segment. For example, Te can be computed as the timestamp of the current frame minus the start time of the first frame in the current segment, as indicated in the flow diagram of FIG. 5.

5. When a user initiates a content switch, the viewer application 114 estimates the staggered offset of the new content stream segment whose video is most likely to start where the current stream leaves off in terms of video run time, i.e., minimum latency change. The shift in the offset index can be reasonably estimated from Te, such that Δi=int ((Te+Td)/Tg+0.5), where int(•) is the integer operator. The offset index of the new stream is then given by i(new)=(i (current)+Δi) mod(n), where i(current) is the offset index of the current stream and mod(•) is the modulo operator. Allowing for the download and processing time of the new segment, the current segment will continue to play for a period roughly equal to Td after initiation of a content switch until the new segment is ready to play. This series of actions is further illustrated in the flow diagram of FIG. 5. As mentioned previously, each client can individually determine its Td, for example, as a running average of measured startup delays.

6. The built-in media receiver/player 112 is loaded with the new stream's index file URL which, in some embodiments, includes the stream's offset index as well as the content ID in its naming convention. Once updated, the media receiver/player 112 switches streams on its own and continues playing from the new stream without further instruction from the viewer application 114. For example, at all times, per content stream, the media receiver/player 112 requests only one stream with one specific offset from one of the web servers 106 despite the availability of n streams, thus minimizing bandwidth overhead. With separate clients, however, even if they are viewing the same content from the same web server, each is likely to be downloading a stream with a different offset.

The above-described exemplary staggering arrangement limits latency shift on stream switching to a value of about Tg.

The present embodiment utilizes HTTP and functions on a best-effort basis. It is therefore possible that, depending on network performance, large shifts in latency could still occur on occasion.

To reduce the probability of such sudden latency shifts, the content delivery system 100 as a whole should be configured for both relatively high latency, e.g., large Ts, and high speed distribution between the video server and the web servers. Here, the large Ts increases the probability that the needed segments are in place and can accommodate occasional congestion between the client and the web servers.

It should also be noted that HLS and other HTTP streaming protocols typically accommodate adaptive streaming techniques where each stream is encoded at different quality levels, requiring different amounts of bandwidth to download. The client's player is informed of the choice of quality levels via the playlist. The player automatically chooses which bitrate stream to request based on display resolution and link speed. The FIG. 1 embodiment is fully compatible with adaptive streaming with straightforward configuration of additional video encoders and stream segmenters.

Again, it is important to note that, while illustrative embodiments utilize Apple HLS or other HTTP streaming protocols, the disclosed techniques are more generally applicable to a wide variety of other streaming techniques.

Figure 3:
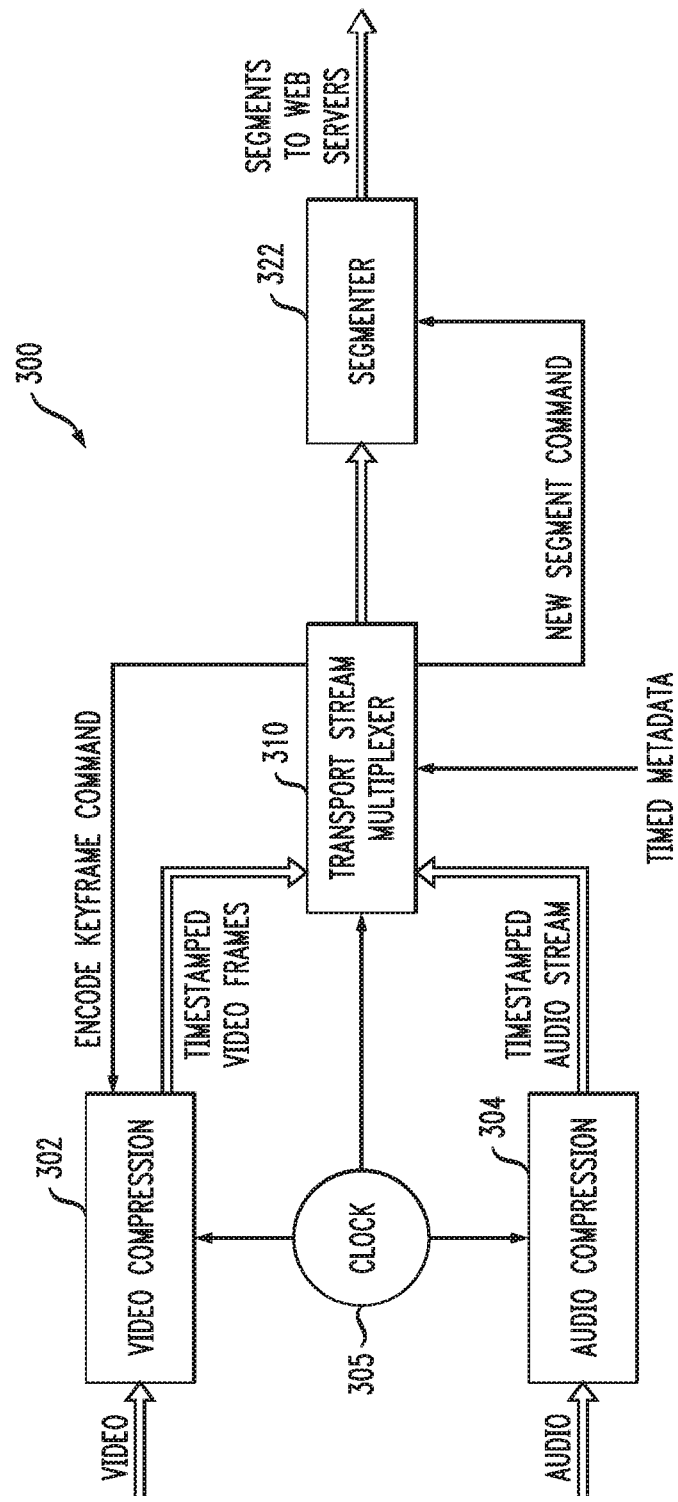
FIG. 3 is a block diagram showing a portion of a video server of the FIG. 1 system.

FIG. 3 shows a portion 300 of the video server 104 of FIG. 1 in greater detail. This portion may be viewed as comprising encoder and segmenter functionality for a given content stream. The encoder functionality for each such content stream comprises separate video and audio compression engines 302 and 304, a timer implemented as clock 305, and a multiplexer 310 that packages media content into a transport stream. The video compression engine 302 illustratively utilizes MPEG or H.264 video encoding, and the audio compression engine 304 illustratively utilizes MP3 or AAC audio encoding, although it is to be appreciated that other video and audio coding techniques can be applied in other embodiments. The video compression engine 302 and possibly other parts of the video server portion 300 are assumed to be components of a video coder-decoder ("codec") of the client 110.

Timestamps are added as metadata to each encoded video frame and to corresponding blocks of compressed audio data. The compressed frames are held for synchronized delivery to the multiplexer 310 as shown in the flow diagram of FIG. 4. In other words, if there are m alternative content sources and each is to be staggered n ways, producing m distinct sets of n content streams, then all m×n multiplexers will synchronize their action at this convenient instance.

At this point, if it is determined that this should be the last frame in the current segment, embedded program code in the multiplexer 310 issues commands for a segmenter 322 to start a new segment on the next frame and for the video codec comprising video compression engine 302 to generate a keyframe. The segmentation time marker is incremented by Ts to identify the next segmentation time. The next step is to package the video, audio, timed metadata, and, if necessary, reinsert the timestamp according to the HLS standard for transport. The last step is to output the packaged transport stream section to the segmenter 322, which will terminate and distribute the current segment.

To enforce the staggering of the segments, the segmentation time marker is initialized for each of n instances of multiplexer 310 to be increments of Tg apart. The initialization, applied to all m sets of staggered content streams, takes place only once at the beginning of broadcast.

Figure 4:
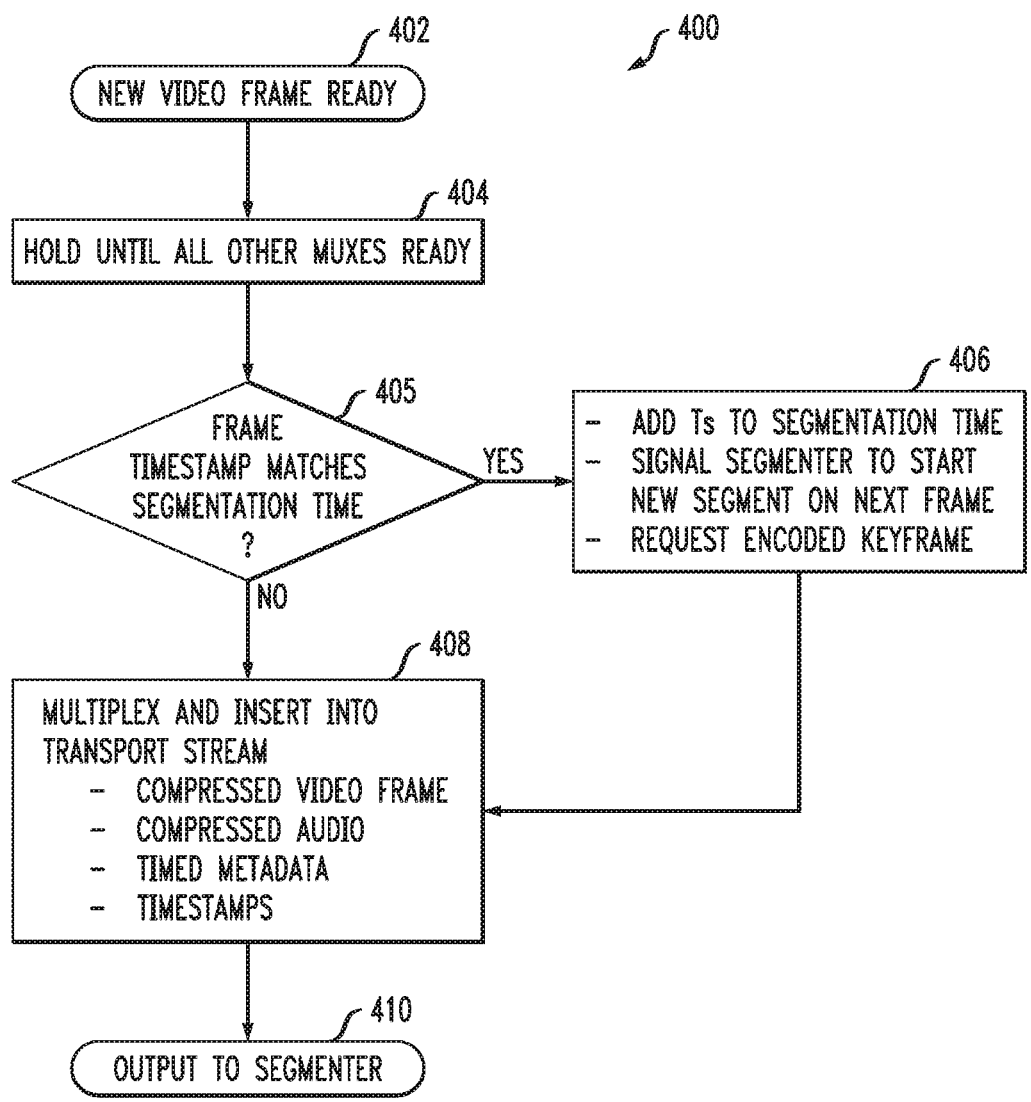
FIG. 4 is a flow diagram illustrating the operation of a transport stream multiplexer in the video server of FIG. 3.

Referring now more particularly to the flow diagram of FIG. 4, an example process 400 as illustrated therein illustratively comprises steps 402 through 410, assumed to be performed by the above-described portion 300 of the video server 104.

In step 402, a new video frame is ready. This is a compressed video frame generated by the video compression engine 302.

In step 404, the new video frame is held until all transport stream multiplexers ("muxes") corresponding to respective instances of multiplexer 310 are ready.

In step 405, a determination is made as to whether or not the timestamp of the new video frame matches the segmentation time. If it does match, the process moves to step 408 via step 406, and otherwise moves directly to step 408 and bypasses step 406.

In step 406, the segmentation time marker is incremented by Ts to identify the next segmentation time. The segmenter 322 is signaled to start a new segment on the next frame, via the new segment command illustrated in FIG. 3, and a request is generated to the video codec for the keyframe via the encode keyframe command illustrated in FIG. 3.

In step 408, the compressed video frame, compressed audio and timed metadata are multiplexed and inserted into the transport stream. Additionally, one or more timestamps may be reinserted in accordance with the HLS standard for transport.

In step 410, the packaged transport stream section is output to the segmenter 322, which will terminate and distribute the current segment.

Steps 402 through 410 are repeated for additional video frames as needed.

Figure 5:
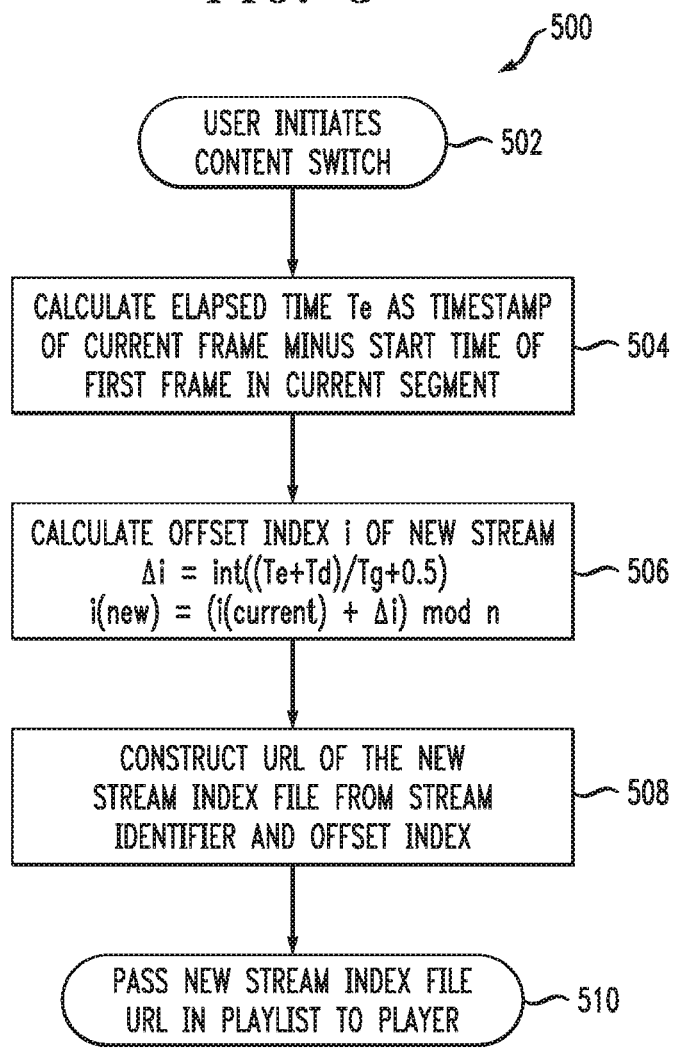
FIG. 5 is a flow diagram illustrating a stream switch initiation sequence of an application program running on a client of the FIG. 1 system.

As mentioned previously, example process operations associated with switching from one content stream to another in a manner that reduces latency shift are shown in FIG. 5. More particularly, FIG. 5 shows a process 500 performed on the client 110 of the content delivery system 100. The process includes steps 502 through 510.

In step 502, a user initiates a content switch by providing user control input to the viewer application 114. For example, the user may enter via a user interface of client 110 a command for the viewer application 114 to switch from one camera view of a live event broadcast to another camera view of the live event broadcast, where each camera view corresponds to a different one of the live sources 102. Numerous other types of content switching between content from one of the live sources 102 to content from another one of the live sources 102 are also possible.

In step 504, the viewer application 114 calculates the elapsed time Te of the current frame from the beginning of the current segment, using timestamps provided by the media receiver/player 112 to the viewer application 114 as metadata. More particularly, in this embodiment Te is illustratively computed as the timestamp of the current frame minus the start time of the first frame in the current segment. Other techniques can be used to compute Te in other embodiments.

In step 506, the viewer application 114 utilizes Te to calculate the offset index i of the new stream that will substantially minimize latency shift relative to the current stream. In the present embodiment, this illustratively involves first estimating the shift $\Delta i$ in offset index as $\Delta i=\text{int}((Te+Td)/Tg+0.5)$, where $\text{int}(\cdot)$ is the integer operator. The offset index i of the new stream is then given by $i(\text{new})=(i(\text{current})+\Delta i) \mod(n)$, where i(current) is the offset index of the current stream and $\mod(\cdot)$ is the modulo operator. Other computations can be used to determine the offset index i of the new stream from information such as Te, Td and Tg, as will be appreciated by those skilled in the art.

In step 508, the viewer application 114 constructs the URL of the new stream index file from the stream identifier and the offset index i determined in step 506.

In step 510, the viewer application 114 passes the URL of the new stream index file in a playlist to the media receiver/player 112. The media receiver/player 112 then switches to the new stream. As mentioned previously, the media receiver/player 112 requests only one stream with a specific offset from one of the web servers 106 despite the availability of n streams from the corresponding content source, thus minimizing bandwidth overhead.

In the present embodiment, latency shift at the client 110 upon switching from a content stream for one of the live sources 102 to a content stream for another one of the live sources 102 can be controlled so as to be less than or equal to the offset Tg. Advantageously, this is achieved in a bandwidth-efficient manner in which only a single content stream is downloaded at a given time by the client 110 from the distributed web servers 106. Moreover, there is no significant overhead added to the index files 130, which also helps to conserve bandwidth and improves performance.

Steps 502 through 510 may be repeated for one or more additional iterations responsive to further changes in live source selection.

The particular process operations described in conjunction with FIGS. 3, 4 and 5 above are presented by way of illustrative example only, and should not be construed as limiting in any way. Other embodiments can generate and process staggered content streams from multiple content sources using additional or alternative techniques.

As noted above, the stream staggering arrangement illustrated in FIG. 2 is exemplary only, and other staggering arrangements may be used. Another such exemplary staggering arrangement will now be described with reference to FIG. 6. This arrangement utilizes flexible keyframe access with two keyframes per segment and a Ts/Tg ratio of 6. The term "keyframe" as used in this context and elsewhere herein is intended to be broadly construed so as to encompass, for example, an IDR frame or other type of I-frame, although the term should not be construed as limited solely to I-frames.

With regard to flexible keyframe access, it should be noted that a conventional Apple HLS player can start decoding a new stream only from the first keyframe it finds in a segment. If a stream contains more than one keyframe, a viewer application in some embodiments cannot direct the player to initiate play from a later keyframe location while switching streams. This is because in some embodiments the player needs time to download the next segment before the current segment is played out. Such conventional Apple HLS players can therefore not utilize flexible keyframe access.

Embodiments of the invention can modify the HLS player to provide a custom or upgraded player in which flexible keyframe access is possible. With sufficient bandwidth and a custom or upgraded player, the ability to select which keyframe in a segment to jump to in such embodiments substantially reduces the number of staggered streams needed to achieve the same latency shift control as the FIG. 2 embodiment.

Figure 6:
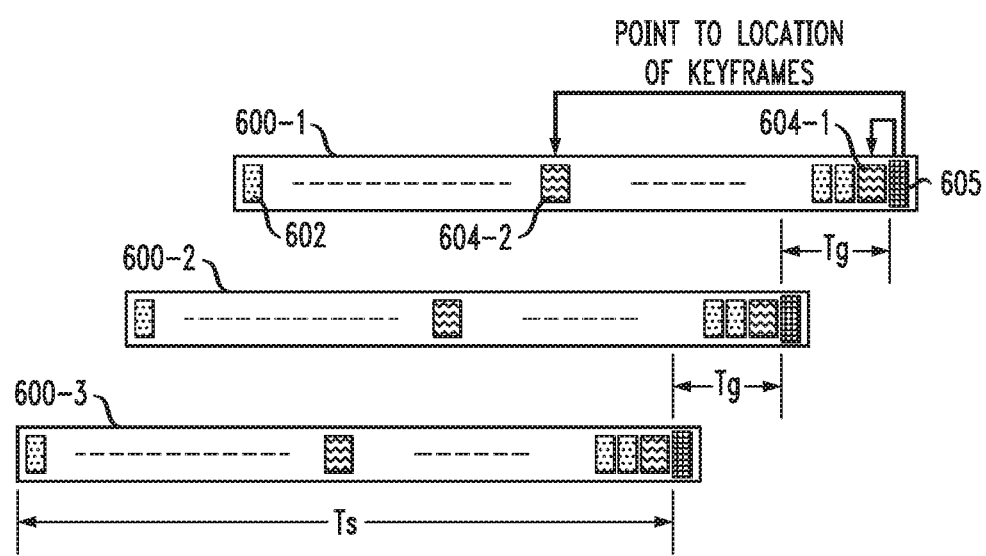
FIG. 6 shows another example of segment staggering implemented in the FIG. 1 system in another embodiment.

Consider a segment that includes k keyframes rather than a single keyframe. In this case, the number of staggered streams used to provide n access points in a Ts time period drops to n/k. Here, n and k are chosen so that n/k is an integer. As a more particular example, in the case of the FIG. 2 embodiment, if Ts=6 seconds and Tg=1 second, 6 staggered segment streams are encoded and distributed per content stream. However, using the alternative flexible keyframe access approach, with 3 seconds between keyframes, k=2 and only 3 staggered streams are used to achieve the same latency shift control. This particular arrangement is illustrated in FIG. 6 which shows a snapshot of three segments 600-1, 600-2 and 600-3 staggered 1Tg apart providing 6 keyframe access locations in a period of Ts=6Tg. Each of the three segments 600-1, 600-2 and 600-3 illustratively comprises a plurality of frames 602 and two keyframes respectively denoted 604-1 and 604-2.

Implementation of the FIG. 6 embodiment involves incorporating additional functionality into the video servers and the clients. At the video server end, each multiplexer inserts pointers in the metadata 605 at the beginning of each segment, with the pointers pointing to the respective locations of the keyframes 604 within the segment.

The viewer application 114 on the client side derives two indices during a content switch: one to identify the stagger offset of the new stream; the other to identify which keyframe within the new segment to start from. If we use index j, where j ranges from 0 to n−1, to denote the offset index, and each increment of j indicates a stagger offset of Tg, then the desired stream offset index i would be $i=j \mod(n/k)$. The desired keyframe, Ki, would be $Ki=k \times (j-i)/n$, where Ki ranges from 0, corresponding to the first keyframe in a segment, to k−1, corresponding to the last keyframe in the segment. Both i and Ki are passed to the player via a playlist. If Ki is greater than 0, the player is in effect instructed to skip the first keyframe in a segment. It then locates the desired keyframe from the pointer in the segment metadata 605.

Implementations of the FIG. 6 embodiment utilizing the existing HLS standard are more readily implemented on certain types of mobile devices, such as Android devices. However, the embodiment can be implemented using any type of mobile device or more generally any other type of client device, including, for example, desktop, laptop or tablet personal computers, smart televisions, gaming systems and other processing devices.

It should once again be noted that the above-described staggering arrangements are exemplary only, and alternative arrangements can be used in other embodiments.

The illustrative embodiments, as mentioned previously, add multiple access points into content streams so that a player can start a new stream at finer locations than would otherwise be possible, thereby limiting stream switching latency shift. This is accomplished in the illustrative embodiments in a manner that utilizes extra bandwidth and storage where it is plentiful, for example, where the video server pushes the files out to the web servers at the network edge, and does not add any significant bandwidth requirement where bandwidth is expensive, for example, where clients are pulling the files for last mile delivery.

The disclosed techniques can provide significant advantages in numerous applications other than live video broadcast. For example, advantages are provided in video curation, where users mix and match their own live contents. Also, applications such as gaming and advertising that require some temporal synchronization of disparate content streams will benefit from controlling latency shift when switching content streams. Other applications include more precise seek and replay capability and synchronization of contents on collocated displays.

A given client or server in the FIG. 1 system is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor such as the MPU noted above, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations associated with content delivery.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide functionality such as ad insertion, playback modes such as seek and replay, support for multiple collocated displays, etc. The disclosed techniques can be similarly adapted for use in a wide variety of other types of content delivery systems that can benefit from reduced latency shift in stream switching.

It is also to be appreciated that the particular process steps used in the embodiments described above are exemplary only, and other embodiments can utilize different types and arrangements of processing operations. For example, the particular manner in which segments of multiple replicated streams generated from a given content source are staggered relative to one another can be varied in other embodiments.

It should again be emphasized that the embodiments of the invention as described herein are intended to be illustrative only. Other embodiments of the invention can be implemented utilizing a wide variety of different types and arrangements of content delivery systems, networks, client and server configurations, and stream staggering arrangements than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising:

receiving a selected content stream of a first set of multiple content streams each comprising content from a first source;

in conjunction with switching from the selected content stream to a content stream of a second set of multiple content streams each comprising content from a second source, utilizing an offset index of the selected content stream relative to other content streams in the first set to identify a particular one of the content streams of the second set in a manner that limits a latency shift between the selected content stream of the first set and the particular content stream of the second set; and requesting delivery of the particular content stream of the second set;

wherein utilizing an offset index of the selected content stream relative to other content streams in the first set to identify a particular one of the content streams of the second set in a manner that limits a latency shift between the selected content stream of the first set and the particular content stream of the second set comprises:

computing an offset index of the particular content stream of the second set of content streams that will provide a limited latency shift relative to the selected content stream of the first set of content streams;

generating an index file for the offset index of the particular content stream; and utilizing the index file to request the particular content stream;

wherein computing the offset index of the particular content stream comprises:

estimating a shift in offset index as a function of an elapsed time from a beginning of a current segment, a new content stream start-up delay, and an inter-stream offset value; and determining the offset index of the particular content stream as a function of the estimated shift;

wherein the receiving, utilizing and requesting are implemented in at least one processing device comprising a processor coupled to a memory.

2. The method of claim 1 wherein each of the first and second sets of content streams comprises a plurality of content streams segmented such that each content stream comprises segments of length Ts with corresponding segments in adjacent ones of the content streams being offset in time relative to one another by an offset Tg.

3. The method of claim 2 wherein the latency shift between the selected content stream of the first set and the particular content stream of the second set is less than or equal to Tg.

4. The method of claim 1 wherein said at least one processing device comprises a client device.

5. The method of claim 1 wherein the first and second sources comprise respective first and second live video sources.

6. An article of manufacture comprising a computer-readable storage medium having computer program code embodied therein, wherein the computer program code when executed in said at least one processing device causes said at least one processing device to perform a method comprising:
  receiving a selected content stream of a first set of multiple content streams each comprising content from a first source;
  in conjunction with switching from the selected content stream to a content stream of a second set of multiple content streams each comprising content from a second source, utilizing an offset index of the selected content stream relative to other content streams in the first set to identify a particular one of the content streams of the second set in a manner that limits a latency shift between the selected content stream of the first set and the particular content stream of the second set; and
  requesting delivery of the particular content stream of the second set;
  wherein utilizing an offset index of the selected content stream relative to other content streams in the first set to identify a particular one of the content streams of the second set in a manner that limits a latency shift between the selected content stream of the first set and the particular content stream of the second set comprises:
    computing an offset index of the particular content stream of the second set of content streams that will provide a limited latency shift relative to the selected content stream of the first set of content streams;
    generating an index file for the offset index of the particular content stream; and
    utilizing the index file to request the particular content stream;
  wherein computing the offset index of the particular content stream comprises:
    estimating a shift in offset index as a function of an elapsed time from a beginning of a current segment, a new content stream start-up delay, and an inter-stream offset value; and
    determining the offset index of the particular content stream as a function of the estimated shift.

7. The article of manufacture of claim 6 wherein said at least one processing device comprises a client device.

8. The article of manufacture of claim 6 wherein the first and second sources comprise respective first and second live video sources.

9. The article of manufacture of claim 6 wherein each of the first and second sets of content streams comprises a plurality of content streams segmented such that each content stream comprises segments of length Ts with corresponding segments in adjacent ones of the content streams being offset in time relative to one another by the offset Tg, and wherein the latency shift between the selected content stream of the first set and the particular content stream of the second set is less than or equal to Tg.

10. An apparatus comprising:
  at least one processing device comprising a processor coupled to a memory;
  wherein said at least one processing device is configured:
    to receive a selected content stream of a first set of multiple content streams each comprising content from a first source;
    in conjunction with switching from the selected content stream to a content stream of a second set of multiple content streams each comprising content from a second source, to utilize an offset index of the selected content stream relative to other content streams in the first set to identify a particular one of the content streams of the second set in a manner that limits a latency shift between the selected content stream of the first set and the particular content stream of the second set; and
    to request delivery of the particular content stream of the second set;
  wherein utilizing an offset index of the selected content stream relative to other content streams in the first set to identify a particular one of the content streams of the second set in a manner that limits a latency shift between the selected content stream of the first set and the particular content stream of the second set comprises:
    computing an offset index of the particular content stream of the second set of content streams that will provide a limited latency shift relative to the selected content stream of the first set of content streams;
    generating an index file for the offset index of the particular content stream; and
    utilizing the index file to request the particular content stream;
  wherein computing the offset index of the particular content stream comprises:
    estimating a shift in offset index as a function of an elapsed time from a beginning of a current segment, a new content stream start-up delay, and an inter-stream offset value; and
    determining the offset index of the particular content stream as a function of the estimated shift.

11. The apparatus of claim 10 wherein said at least one processing device comprises a client device.

12. The apparatus of claim 11 wherein the limited latency shift upon switching from the selected content stream of the first set to the particular content stream of the second set is achieved without requiring the client device to download more than one content stream at a given time.

13. The apparatus of claim 11 wherein the limited latency shift upon switching from the selected content stream of the first set to the particular content stream of the second set is achieved without requiring additional overhead in content stream index files.

14. The apparatus of claim 10 wherein the first and second sources comprise respective first and second live video sources.

15. The apparatus of claim 10 wherein the inter-stream offset value comprises an offset Tg.

16. The apparatus of claim 15 wherein the multiple content streams of a given one of the first and second sets are generated by:
  encoding content in respective ones of a plurality of encoders; and
  segmenting the encoded content using staggered segmentation locations for respective ones of the content streams so as to implement the offset Tg between adjacent ones of the content streams of the given one of the first and second sets.

17. The apparatus of claim 15 wherein each of the first and second sets of content streams comprises a plurality of content streams segmented such that each content stream comprises segments of length Ts with corresponding segments in adjacent ones of the content streams being offset in time relative to one another by the offset Tg, and wherein the latency shift between the selected content stream of the first set and the particular content stream of the second set is less than or equal to Tg.

18. The apparatus of claim 10 wherein at least one of the segments of at least one of the multiple content streams of a given one of the first and second sets comprises only a single keyframe.

19. The apparatus of claim 10 wherein at least one of the segments of at least one of the multiple content streams of a given one of the first and second sets comprises a plurality of keyframes.

* * * * *